United States Patent
Kruger et al.

(10) Patent No.: US 6,367,075 B1
(45) Date of Patent: Apr. 2, 2002

(54) METHOD AND APPARATUS FOR PRODUCING INSTRUCTIONS DESCRIBING THE REMOVAL OF UPDATES TO A COMPUTER SYSTEM

(75) Inventors: Louis P Kruger, Mountain View; Anson Mah, Los Gatos; Sami Shaio, Palo Alto, all of CA (US)

(73) Assignee: Marimba, Inc., Mountain View, CA (US)

( * ) Notice: Subject to any disclaimer, the term of this patent is extended or adjusted under 35 U.S.C. 154(b) by 0 days.

(21) Appl. No.: 09/345,999

(22) Filed: Jun. 30, 1999

Related U.S. Application Data (63) Continuation-in-part of application No. 09/343,979, filed on Jun. 30, 1999, which is a continuation of application No. 08/690,257, filed on Jul. 24, 1996, now Pat. No. 5,919,247.

(51) Int. Cl.[7] ................................................ G06F 9/455
(52) U.S. Cl. ............................................. 717/11; 717/3
(58) Field of Search ..................................... 717/1, 11, 3

(56) References Cited

U.S. PATENT DOCUMENTS

| | | | |
|---|---|---|---|
| 5,872,979 A | * | 2/1999 | Edel et al. ..................... 717/11 |
| 6,038,393 A | | 3/2000 | Iyengar et al. |
| 6,052,531 A | * | 4/2000 | Waldin, Jr. et al. ........... 717/11 |
| 6,131,192 A | | 10/2000 | Henry |
| 6,167,567 A | * | 12/2000 | Chiles et al. .................. 717/11 |
| 6,199,198 B1 | | 3/2001 | Graham |
| 6,216,140 B1 | | 4/2001 | Kramer |
| 6,216,175 B1 | * | 4/2001 | Sliger et al. .................... 710/1 |
| 6,226,652 B1 | | 5/2001 | Percival et al. |
| 6,226,747 B1 | * | 5/2001 | Larsson et al. ............. 713/200 |

OTHER PUBLICATIONS

Dan Mather, Automated Installation and Updating of Windows–Based Internet Aplications at James Madison University. Winning the Network Game. 1995. pp. 207–209.
Feller. Software Process Support Through Software Configuration Management. ACM. pp. 58–60., 1990.*
Thomas. Version and Configuration Management on a Software Engineering Database. ACM. pp. 23–25., 1989.*

* cited by examiner

*Primary Examiner*—Mark R. Powell
*Assistant Examiner*—Wei Zhen
(74) *Attorney, Agent, or Firm*—Innovation Partners; Charles E. Gotlieb (57) ABSTRACT

A computer program product and apparatus builds a set of uninstall instructions from a set of installation instructions so that one or more installations of computer updates can be removed.

24 Claims, 5 Drawing Sheets

METHOD AND APPARATUS FOR PRODUCING INSTRUCTIONS DESCRIBING THE REMOVAL OF UPDATES TO A COMPUTER SYSTEM

RELATED APPLICATIONS

This application is a continuation in part of copending application Ser. No. 09/343,979 filed Jun. 30, 1999, entitled, "METHOD AND APPARATUS FOR IDENTIFYING CHANGES MADE TO A COMPUTER SYSTEM DUE TO SOFTWARE INSTALLATION" filed concurrently herewith by Louis Kruger, Sami Shaio and Anson Mah, and is related to copending application Ser. No. 09/231,322 entitled, "System and Method for the Distribution of Code and Data" filed Jan. 13, 1999, now U.S. Pat. No. 6,272,536, issued 8/7/2001, which is a continuation of application Ser. No. 08/690,257 entitled, "System and Method for the Distribution of Code and Data", filed, Jul. 24, 1996, now U.S. Pat. No. 5,919,247, issued Jul. 6, 1999, each having the same assignee as this application and each is incorporated herein by reference in its entirety. each having the same assignee as this application and each is incorporated herein by reference in its entirety.

FIELD OF THE INVENTION

The present invention is related to computer software more specifically to computer software for updating a computer system.

BACKGROUND OF THE INVENTION

Some computer software may be used to update files on a computer system. Updating files may include adding new files, deleting old files, and replacing some or all of one file with some or all of another file. The computer system receives instructions for updating the files and may receive new files. The new files may include files to be added or files used to replace existing files, or may contain instructions for modifying one or more existing files. The computer software performs the updates according to the instructions using the files it receives.

When the files on a computer system are updated, the computer system may not work properly due to an error in the instructions, one or more of the files used to perform the updates, or both the instructions and the files. When this happens, it is desirable to remove the update, thereby placing the computer system back to its state before the update was performed. If several updates have been applied, it may be desirable to remove some or all of the updates, for example to place the computer system back to its state before any updates were applied. Because computer software can occupy resources on the computer system, it is desirable to perform the above removal functions without requiring the installation on the computer system of special computer software to perform the removal alone.

What is needed is a method and apparatus that can allow one or more updates to be removed from a computer system without requiring the installation of additional computer software.

SUMMARY OF INVENTION

A method and apparatus creates instructions for removing an update using instructions used to perform the update. The instructions that will be used to perform the update are compared with any prior set of instructions already used to perform an update, and an adjusted set of installation instructions are produced. The state of objects on the computer system on which the installation will be performed is recorded. The instructions for removing the update are produced from the adjusted set of installation instructions and the recorded state of the objects.

DETAILED DESCRIPTION OF A PREFERRED EMBODIMENT

Figure 1:
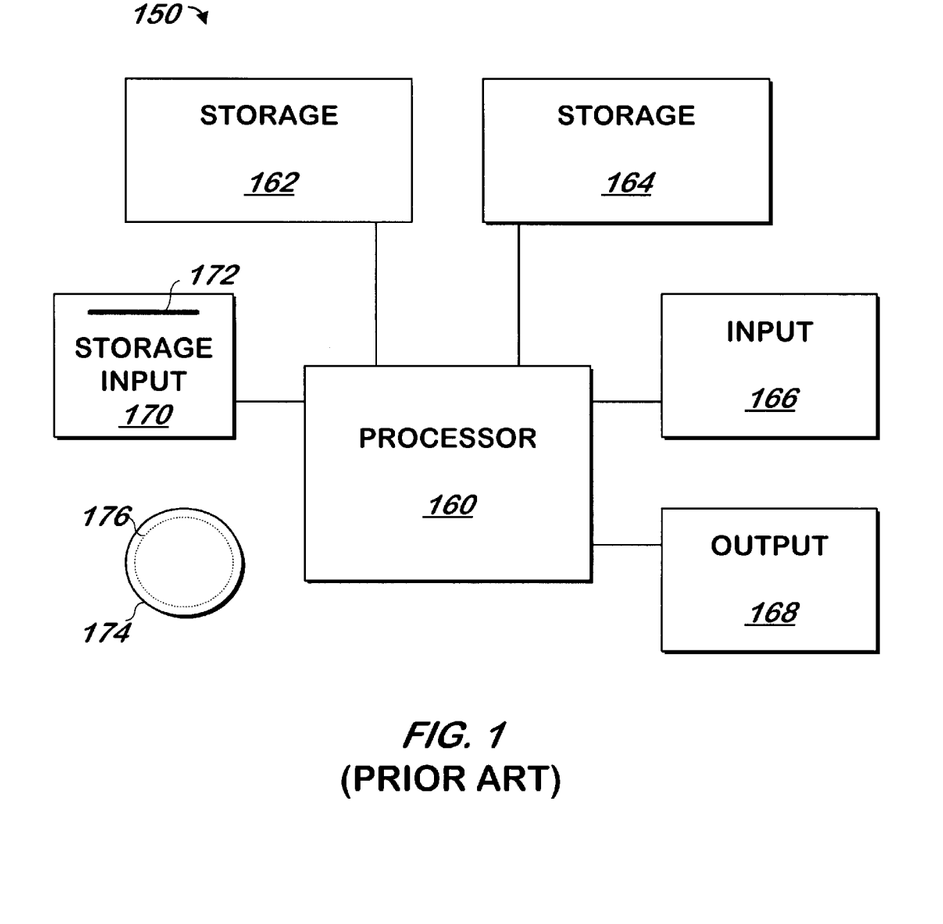
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM compatible computer system commercially available from Dell Computer Corporation of Round Rock, Texas, running the conventional Microsoft Windows operating system, a conventional Ultra Sparc workstation running the conventional Solaris operating system commercially available from Sun Microsystems of Palo Alto, Calif. or a conventional MacIntosh Computer System running the conventional MacOS operating system commercially available from Apple Computer Corporation of Cupertino, Calif. although other systems may be used.

Figure 2:
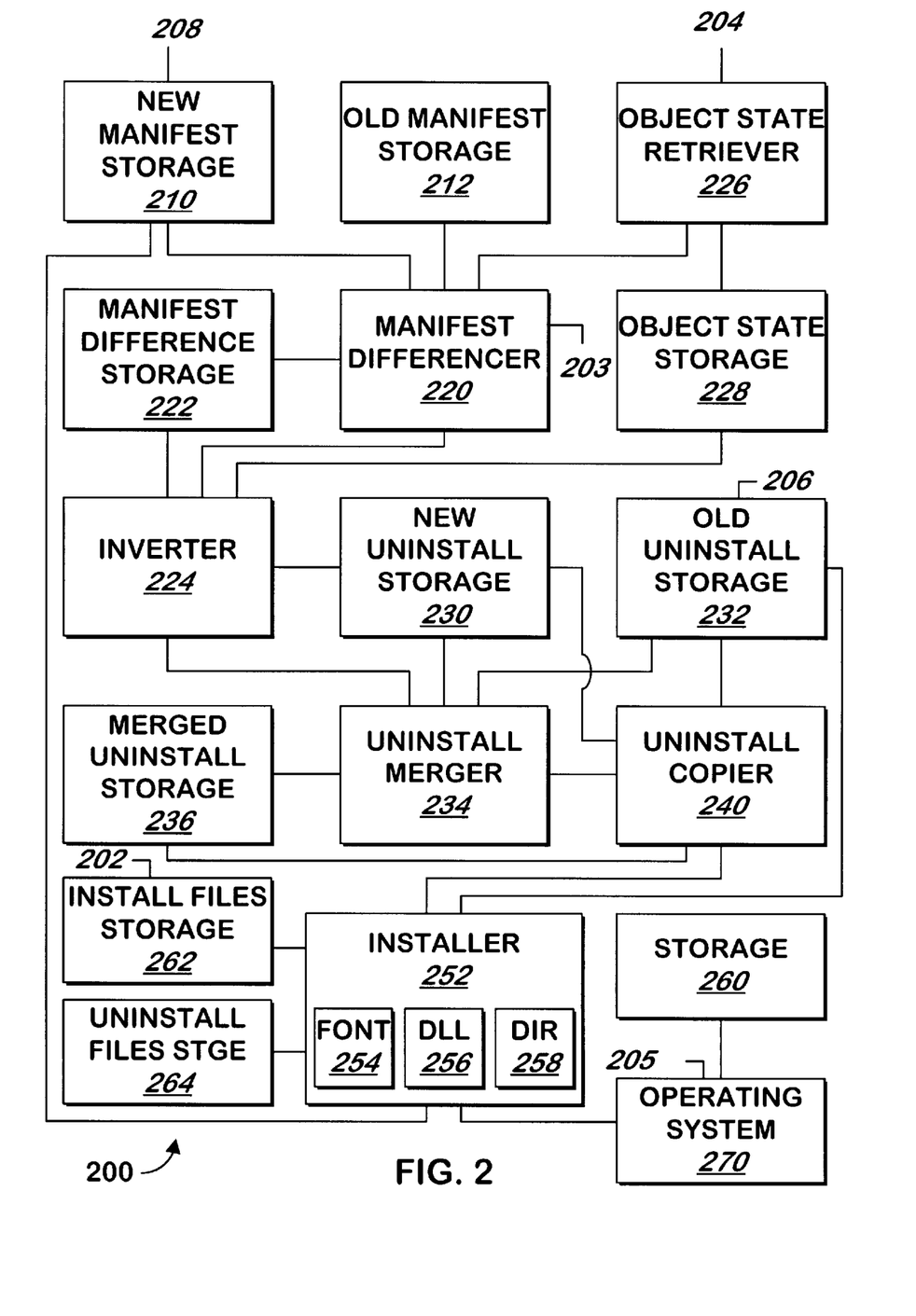
FIG. 2 is a block schematic diagram of a providing instructions to uninstall one or more updates according to one embodiment of the present invention.

Referring now to FIG. 2, an apparatus 200 for providing instructions to uninstall one or more updates is shown according to one embodiment of the present invention. The apparatus 200 resides on the computer system onto which the updates are applied in one embodiment. In another embodiment, the updates are applied to a different computer system.

New manifest storage 210 receives at input 206 the manifest described in copending application serial number AA/AAA,AAA, for example, via management software described in application Ser. No. 09/231,322 and 08/690,257 New manifest storage 210 is any form of storage such as conventional memory or disk storage. Old manifest storage 212 stores any manifest that was received immediately prior to the manifest in new manifest storage 210 and was used to install an update to the computer system. In one embodiment, each of the manifests stored in new manifest storage 210 and old manifest storage 212 is a tree containing subtrees, described in copending application serial number AA/AAA,AAA, although other data structures may be used to store these manifests.

When signaled at input/output 203, manifest differencer 220 compares and identifies the differences between the manifest in new manifest storage 210 and the manifest in old manifest storage 212 using the same methods as are described with reference to FIGS. 2 and 5 or 6 of copending application serial number AA/AAA,AAA. Input/output 203 is coupled to the operating system 270 (through a connection not shown to avoid cluttering the Figure) which is coupled to a conventional keyboard/mouse/monitor combination input/output devices via input/output 205.

To summarize, manifest differencer 220 selects each node in the new manifest and attempts to match that node with a node in the old manifest having the same name and descending from a parent that had the same name as the parent of the selected node in the new manifest. If a match is identified, manifest differencer 220 identifies whether the node in the new manifest was "deleted" from the old manifest, was "added" to the old manifest, has the "same" properties as the old manifest or has the same name but "changed" properties. Manifest differencer 220 builds a supertree corresponding to all nodes in both trees (with nodes that are the "same" or "changed" having a single node in the supertree) and adds to each node a difference flag describing the difference between the old manifest and the new manifest ("delete" for a node in the old manifest but not the new manifest, "add" for a node in the new manifest but not the old manifest, "same" for identical nodes in each manifest and descending from parents with matching names, or "change" for a node with the same name but different properties in each manifest and descending from parents with matching names). If the manifests in new manifest storage 210 and old manifest storage 212 have installation instructions, describing whether the file should be added, deleted or changed, these installation instructions are ignored by manifest differencer 220 when comparing the nodes to identify whether they are the same or changed. Manifest differencer 220 stores the supertree that results from the comparison and identification of differences in manifest difference storage 222, which may be conventional memory or disk storage.

Figure 3A:
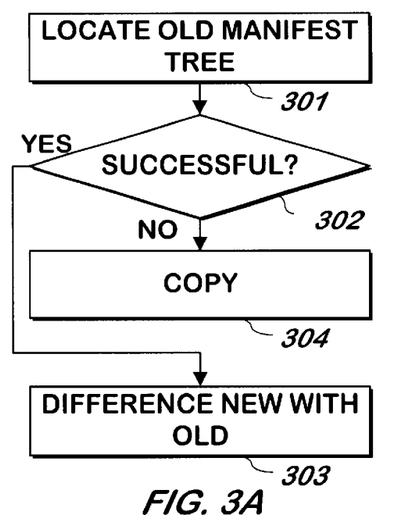
FIG. 3A is a flowchart illustrating a method of computing a differenced manifest from one or two manifests according to one embodiment of the present invention.

If there is no manifest in old manifest storage 212, the new manifest stored in new manifest storage 210 is likely the first manifest received by the apparatus 200. In this case, manifest differencer 220 does not compute the difference as described above. Instead, it copies the new manifest stored in new manifest storage 210 into manifest difference storage 222. All nodes in manifest difference storage 222 are appended with an "add" difference flag by manifest differencer 220 for this special case. Referring momentarily to FIG. 3A, a method of computing a differenced manifest from one or two manifests is shown according to one embodiment of the present invention. An attempt is made to locate the old manifest 301. If the attempt is successful 302, manifest differencer uses the methods described in copending application Ser. No. AA,AAA/AAA to compute the differences between the manifests 303. If the attempt is unsuccessful 302, the new manifest is copied 303 or otherwise designated as the differenced manifest, and a difference flag of "add" is appended 304 to each node in the manifest.

Referring again to FIG. 2, when manifest differencer 220 completes building the supertree in manifest difference storage 222, it signals object state retriever 226 and inverter 224.

Object state retriever 226 retrieves the current state of the computer system on which the files described in the manifest stored in new manifest storage 210 will be installed. Object state retriever 226 builds a tree of object states for the computer system on which the installation is to take place like the object state retriever described in copending application serial number AA/AAA,AAA. Object state retriever 226 stores the tree of current object states it builds into object state storage 228 for use as described below. Object state storage 228 may be conventional memory or disk storage.

Inverter 224 uses the supertree in manifest difference storage 222 to create an inverse tree from the tree stored in manifest difference storage 222 and the corresponding object state in the tree of object state storage 228. The supertree is referred to as a "differenced manifest" because it describes differences between a new manifest and the old manifest. The inverse tree will describe how to undo the changes described in the new manifest stored in new manifest storage 210. Inverter 224 performs the functions described in FIG. 3B described in more detail below and stores the result into new uninstall storage 230, which may be conventional memory or disk storage.

Figure 3B:
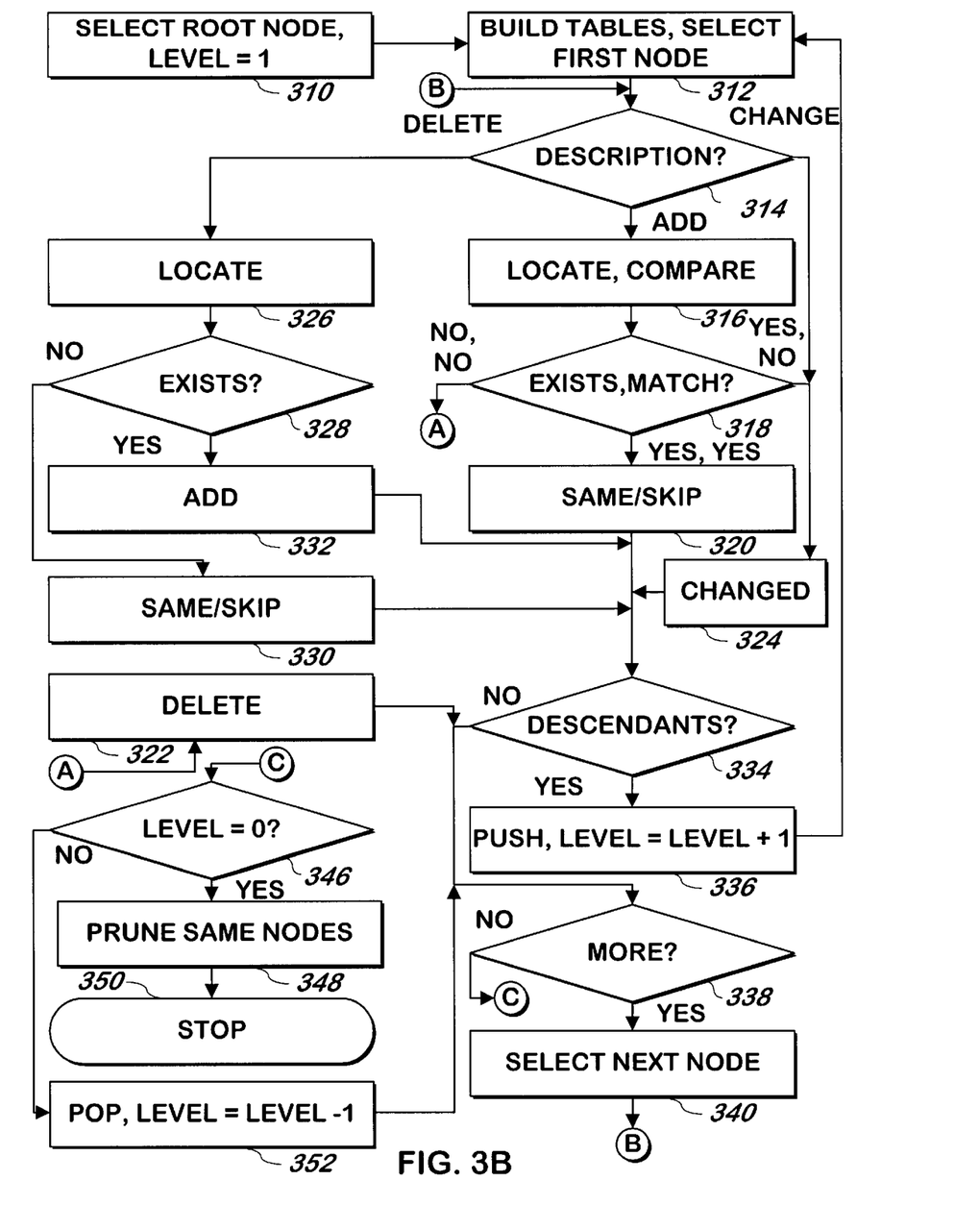
FIG. 3B is a flowchart illustrating a method of computing uninstall instructions from a differenced manifest according to one embodiment of the present invention.

Referring now to FIG. 3B, a method of computing uninstall instructions from a differenced manifest is shown according to one embodiment of the present invention. This method is also known as "inverting the manifest". The differenced manifest may be differenced using two manifests or a single manifest as described above.

The root node from the differenced manifest tree is selected 310 and the root node is located 310 in the tree of current object states (describing the current states of the computer system, such as the one built as described above and stored in object state storage 228). A level counter may be set equal to "1" 310.

Tables corresponding to the descendants of the selected and located nodes are built as described in copending application serial number AA/AAA,AAA, and each row in the table also includes the difference description. A row from the table corresponding to the differenced manifest is selected 312. The row selected in step 312 is any row that has not been previously selected in the method of FIG. 3B, although in one embodiment, the same order of row selection is used as is described in the copending application serial number AA/AAA,AAA.

The difference description, either add, delete or change, is investigated for the selected row. If the difference description is "change" 314, the method continues at step 324 described below. If the difference description is "delete" 314, the method continues at step 326 described below.

If the difference description is "add" 314, the method continues at step 316. The object state corresponding to the selected row is located 316, as described in more detail in copending application serial number AA/AAA,AAA, by locating an object state having a name matching the selected node if the object has a parent that had the same name as the parent of the selected node. (The object state is located using the tree stored in object state storage 228 in one embodiment.) The properties of the node are compared 316 with the properties of the object state. If the object state corresponding to the node selected in step 312 is located and the properties of the object state do not match the properties of the node 318, the method continues at step 324, described below. If the object state corresponding to the selected row is not located 318, the method continues at step 322, described below.

If the object state corresponding to the selected row is located and the properties of the object state match the properties of the node 318, the method continues at step 320. In this circumstance, the state of the computer system on which the installation will take place will not change due to the installation according to the new manifest. Thus, step 320 does not do anything in one embodiment, and the method continues at step 334. In another embodiment, a node is built in the new uninstall tree corresponding to the node selected and the node built is marked as "same".

At step 322, a node is inserted into the new uninstall tree descending from the node in the new uninstall tree corresponding to the parent of the node corresponding to the selected row. The node is inserted with the properties of the object state corresponding to that selected node. Each node in the new uninstall tree has an uninstall operation to signify the operation that is to be performed to undo the installation for the node. The node inserted in step 322 is marked with an uninstall operation of "delete" to signify that to undo the install, the object corresponding to the inserted node should be deleted. Any nodes in the differenced manifest descending from the node corresponding to the selected row are copied to the new uninstall tree in the same manner, preserving their relationships with each other and their parent. Each such node has an uninstall operation of "delete". The method continues at step 338.

At step 324, a node is inserted into the new uninstall tree descending from the node corresponding to the parent of the node corresponding to the selected row. The node is inserted with the properties of the object state corresponding to that selected row. The node is inserted with an uninstall operation of "change" to signify that to undo the install, the object state corresponding to the node should be changed back to the state it was in prior to the install. In one embodiment, any file or other information corresponding to the current state of the object corresponding to the node (i.e. before the installation of the objects corresponding to the new manifest) is marked as changed is copied to a special area of storage, such as uninstall files storage 264, and a pointer to this file or other information is inserted into the node for use as described below. The method continues at step 334.

At step 334, if the selected node has descendants, the tables are pushed onto a stack or otherwise stored and the level counter is incremented 336. The method continues at step 312. Otherwise, the method continues at step 338.

At step 326, the row in the table corresponding to object states that has the same name as the node selected in step 312 is located as described above with respect to step 316. It is not necessary in step 326 to perform the comparison portion of step 316. The method continues at step 328.

If the row is located 328, a node corresponding to the located row is inserted into the new uninstall tree. The node is inserted descending from the node in the new uninstall tree corresponding to the parent of the node corresponding to the selected row. The inserted node contains an uninstall operation of "add" 332 to signify that the node must be added to undo the installation. In one embodiment, step 332 includes copying the object described by the located row, either the file or information, into a separate area and inserting to the node inserted in step 332 a pointer to the copied information to allow the installer 252 or process that performs the undo as described in more detail below to have access to the information that must be added. The method continues at step 334.

If the node does not exist 328, the method continues at step 330. Step 330 operates as step 320.

At step 338, if there are more nodes in the table corresponding to the object state tree, the next node is selected 340 and the method continues at step 314 using the selected node. Otherwise, the method continues at step 346.

If the level counter is equal to 0 346, the method continues at step 348. Otherwise, the level counter is decremented and the tables stack is popped 352 and the method continues at step 338 using the popped tables.

At step 348, the new uninstall tree built as described above is scanned, and any nodes that have an uninstall operation of "same" are removed from the new uninstall tree if all of any nodes descending from such node also have uninstall operations of "same." The method then terminates at step 350.

The tables built in step 312 may be sorted as described in copending application serial number AA/AAA,AAA as part of step 312. In steps 316 and 326, the locating technique using the sort order of the selected node and the next node in the differenced manifest described in that application may be used.

Referring again to FIG. 2, the separate area into which objects may be copied as described above is install files storage 262, which may be conventional memory or disk storage. When inverter 224 inverts the differenced manifest and stores the results in new uninstall storage 230, inverter 224 signals uninstall merger 234. Uninstall merger 234 merges the new uninstall tree in new uninstall storage 230, produced as described above, with the former uninstall tree stored in old uninstall storage 232 as described in FIGS. 4A and 4B. Merging the two trees resolves conflicts between them. In one embodiment, the uninstall tree stored in old uninstall storage 232 is a description of how to uninstall all of the former manifests received, which may itself describe the uninstallation of multiple manifests.

If old uninstall storage 232 is empty, uninstall merger 234 copies the new uninstall tree in new uninstall storage 230 to old uninstall storage 232 for use the next time a manifest is received in new manifest storage 210. Otherwise uninstall merger 234 performs the steps described in FIG. 4A.

Figure 4A:
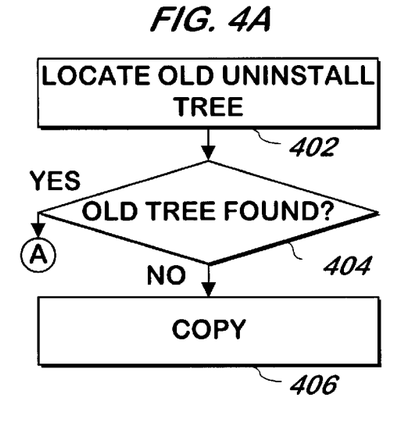
FIGS. 4A and 4B are a flowchart illustrating a method of merging a new uninstall tree with an old uninstall tree according to one embodiment of the present invention.
Figure 4B:
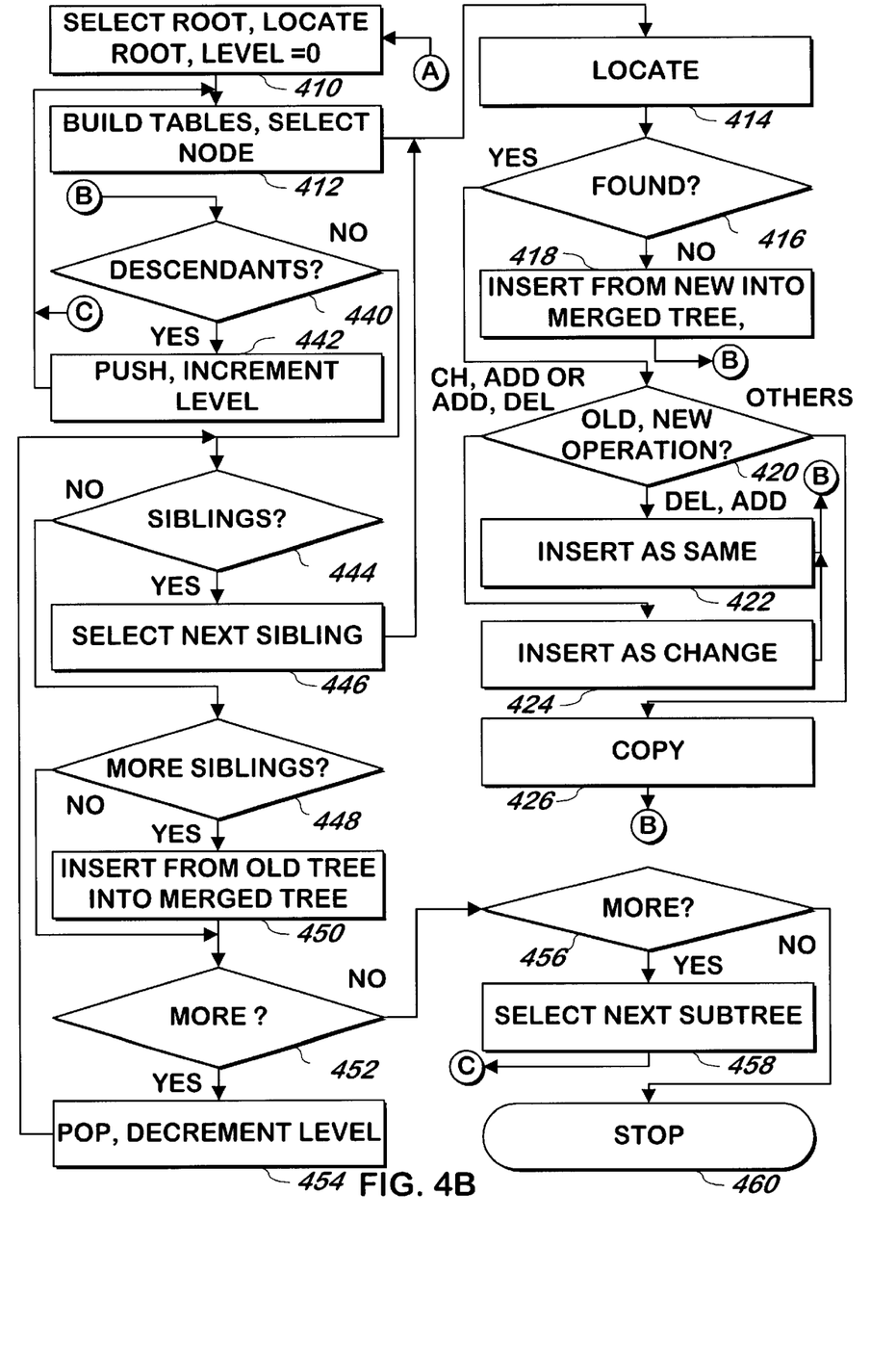

Referring now to FIGS. 4A and 4B, a method of merging a new uninstall tree with an old uninstall tree is shown according to one embodiment of the present invention. The old uninstall tree is located 402. If the old uninstall tree is not found 404, the uninstall tree is copied 406, or the new uninstall tree is otherwise designated as the merged uninstall tree. If the old uninstall tree is located 406 the method continues at step 410 of FIG. 4B.

The root node in the new uninstall tree is selected, the root node in the old uninstall tree is located and a level counter is set equal to zero 410 (Level 0 is the base node for the tree and level 1 identifies the subtree, so level 2 is the first level containing nodes of the tree corresponding to object states as described in the parent application). Tables are built from the descendants of the selected and located nodes as described in copending application serial number AA/AAA,AAA and each row includes the uninstall operation for the node as a property, and a row is selected in the table corresponding to the new uninstall tree. The row corresponding to the selected row is located 414 in the table corresponding to the old uninstall tree if possible as described in the copending application serial number AA/AAA,AAA. The tables ensure that candidate nodes used for location are those that descend from the parent in the old uninstall tree that match the parent node of the selected node in the new uninstall tree.

If the row is not located 416, the node corresponding to the selected row, and any descendants of this node are copied 418 into a merged uninstall tree, with the new node descending from the node in the merged uninstall tree corresponding to the parent of the node in the new uninstall tree corresponding to the selected row. The uninstall operation for the node copied into the merged uninstall tree is the same as the uninstall operation specified for the node in the new uninstall tree, and if the operation is "change", the pointer to the object to restore or instructions for returning the object to its original state is also copied with the node. The method continues at step 440.

If step 414 is successful at locating the row, the method continues at step 420. In step 420, the uninstall operations of the selected row from the new uninstall tree and the located row from the old uninstall tree are investigated. If the uninstall operation of the located row in the old uninstall tree is "delete" and the uninstall operation of the selected row in the new uninstall tree is "add" 420, the node corresponding to the selected row is copied from the new uninstall tree and inserted into the merged uninstall tree, but the uninstall operation is changed to "same", 422. This indicates that no changes need be made to the object corresponding to the node to uninstall the new object. In one embodiment, instead of inserting such a node, Step 424 is not performed and no nodes that have a "same" for an uninstall operation are copied into the merged uninstall tree. In one embodiment, instead of inserting such a node, step 424 is not performed, and no nodes that have "same" for an uninstall operation are copied into the merged uninstall tree. The method continues at step 440.

If the uninstall operation of the selected row in the new uninstall tree is "add", and the uninstall operation of the located row in the old uninstall tree is "delete" 420, or if the uninstall operation for the selected row in the new uninstall tree is "change" and the uninstall operation of the located row in the old uninstall tree is "add" 420, a node corresponding to the selected row in the new uninstall tree is copied into the merged uninstall tree and the uninstall operation is marked as "change" 424. The object (e.g., a file) corresponding to the node may be copied into a reserved area for such object and a pointer to the object in the reserved area is added to the copied node in the merged uninstall tree as part of step 424 to allow the object to be retrieved during any uninstall. The method continues at step 440.

For all other combinations of old and new uninstall operations 420, the node corresponding to the selected row in the new uninstall tree is copied 426 into the merged uninstall tree, with its uninstall operation and any pointers intact. The method continues at step 440.

At steps 440–458, additional nodes of the new uninstall tree are selected. If there are descendants of the node corresponding to the selected node of the new uninstall tree 440, the trees are pushed onto a stack and the level counter incremented and the method continues at step 412 using this selected node.

When the selected node in the new uninstall tree has no descendants 440, if there are additional unselected rows in the table 444, a sibling row in the table corresponding to the new uninstall tree is selected 446 and the method continues at step 414 using this selected row.

If there are no more siblings in the new uninstall tree 444, if there are additional rows not located in step 414 in the table corresponding to the old uninstall tree having parents that were located in step 414 using the parent node of the most recent node selected in the new uninstall tree 448, the nodes corresponding to all such sibling rows in the old uninstall tree, and all of their descendant nodes are copied 450 into the merged uninstall tree, with their uninstall operations and their pointers intact. The method continues at step 452.

At step 452, if there are more nodes in the new tree, the pointer pushed in step 442 is popped from the stack 454 and the level counter is decreased. The method continues at step 444. Otherwise, if there are more subtrees 456, the next subtree is selected 458 and the method continues at step 412. If there are no additional subtrees 456 the level counter will be negative, and the method terminates 460. In one embodiment, step 460 includes scanning the entire tree produced and pruning nodes that have a "same" uninstall operation if all of that node's descendant nodes, if any, have a "same" uninstall operation.

Referring again to FIG. 2, when uninstall merger 234 completes the steps described above, it signals uninstall copier 240. Uninstall copier 240 copies from merged uninstall storage 236 the merged uninstall tree created as described above into old uninstall storage 232, replacing the old uninstall tree stored there previously. Uninstall copier 240 signals installer 252.

In one embodiment, individual manifests may be uninstalled. In such embodiments, uninstall copier 240 copies to old uninstall storage 232 from new uninstall storage 230 the new uninstall tree stored there and associates it with the date of the installation corresponding to this tree. The copy is performed without overwriting any of the uninstall trees in old uninstall storage 232. Instead of using the most recently created merged uninstall tree, installer 252 may use any of these copied new uninstall trees to perform the uninstall, allowing for uninstallation of only one installation.

Installer 252 uses input/output 201 coupled to the operating system 270 to perform the installation as described by the manifest stored in new manifest storage 210. Files that will be copied to perform the installation and files containing other objects used to perform the installation are stored in install files storage 262. The files may be received at input 202 from management software described in the related applications. Using operating system 270, installer 252 scans each node in the manifest in new manifest storage 210. Based on the installation operation for each node, installer deletes files and other objects from, and copies files and other objects from install files storage 262 into, the appropriate storage locations in storage 260. Storage 260 is conventional memory or disk storage for the file system of the computer onto which the installation is to take place.

As described in the copending application serial number AA/AAA,AAA, the files in install files storage 262 may have been renamed, and installer 252 renames the files back to their original names when it performs any such copying.

In one embodiment, installer 252 scans the manifest in new manifest storage 210 for nodes marked as delete as described above in the parent application. Installer 252 uses operating system 270 to delete the objects corresponding to these nodes before processing other objects.

In one embodiment installer 252 identifies nodes corresponding to font files by using the file extension in the name of the node. Installer 252 signifies font installer/remover 254, which installs or deletes such files not by merely copying them or deleting them, but instead uses the appropriate operating system API to install or remove such files.

In one embodiment, installer 252 identifies DLL files using the file extension in the name of the node. Installer 252 signals DLL installer 256, which uses operating system 270 to increment or decrement the reference count for the DLL file, but not below zero, if the operation is add or delete, respectively. Installer 270 does not copy the file unless the DLL does not have a reference count or has a reference count equal to zero.

In one embodiment, if a node being added is a directory node, installer 252 signals directory permission setter 258. Directory permission setter 258 sets up the directory and establishes permissions sufficient for the directory to allow the installer to add files or subdirectories to it so that the install may proceed. After all such directories and files are added, installer 252 rescans the new manifest for these added directories. The permissions for each corresponding directory are set to the same value as the permissions stored as properties in the node so that after the installation the permissions of each directory added match those in the manifest stored in new manifest storage 210.

If it is desired to uninstall all installed files, the user signals installer 252 via input/output 205 of operating system 270, signifying an uninstall is desired. Installer 252 retrieves from old uninstall storage 232 the old uninstall tree, and uses it along with the uninstall files stored in uninstall files storage 262 as described above in the same manner as installer 252 uses the new manifest and install files as described above in order to uninstall all objects previously installed. If desired, the user may select at input/output 205 one of the other uninstall trees stored in old uninstall storage as described above to uninstall a particular manifest. If a tree corresponding to an older manifest is selected for uninstallation, all newer uninstall trees are applied in reverse chronological order before applying the selected tree.

Figure 5:
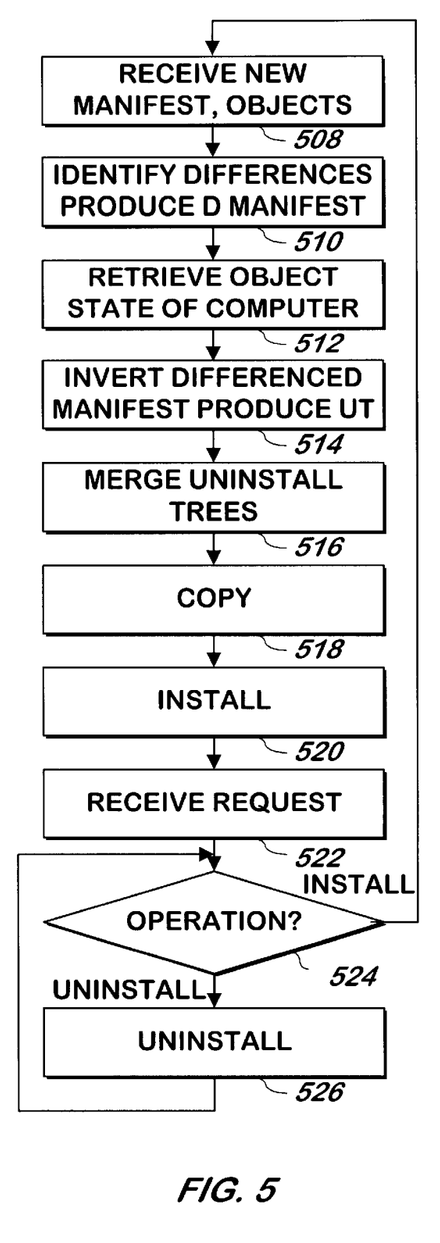
FIG. 5 is a flowchart illustrating a method of creating uninstall instructions from installation instructions according to one embodiment of the present invention.

Referring now to FIG. 5 a method of creating a set of uninstall instructions from installation instructions is shown according to one embodiment of the present invention. A new manifest containing the installation instructions is received, along with any objects to be installed 508. The installation instructions may be in the form of a manifest described in copending application serial number AA/AAA, AAA in one embodiment, or they may be in other forms in other embodiments. The objects may be in the form of files containing the objects.

The new manifest may be converted into a differenced manifest, either by itself as described above, or an old manifest may be used with the new manifest received to produce a differenced manifest as described above 510. The object state of the computer system onto which the objects received in step 508 are to be installed is retrieved as described above 512

The differenced manifest produced in step 510 is inverted 514 as described above using the object state retrieved in step 512 to produce a new uninstall tree. The new uninstall tree produced in step 514 is optionally merged with an old uninstall tree as described above 516. The merged uninstall tree produced in step 516 is optionally copied or otherwise stored as described above and optionally the uninstall tree produced in step 514 is also copied as described above 518.

The update may be performed by installing 520 files and other objects according to the installation operations in the manifest received and files or other objects received as described in step 510. Another operation request, either an install or uninstall, may be received 522. If the request is for an another installation, the method continues at step 510. If the request is for an uninstall, the uninstallation is performed 524 as described above.

What is claimed is:

1. A method of producing a set of uninstall instructions, the method comprising:

receiving a set of installation instructions and a set of a plurality of objects for installation onto a computer system;

producing an adjusted set of installation instructions responsive to the installation instructions received;

identifying a state of each of a second plurality of objects residing on the computer system; and building the set of uninstall instructions responsive to a plurality of the states identified and the set of adjusted installation instructions produced.

2. The method of claim 1 wherein the producing step comprises:

attempting to locate an old set of installation instructions; and responsive to the attempting step locating the old set of installation instructions providing the adjusted set of installation instructions comprising:

a first set of installation instructions corresponding to installation instructions in the set of installation instructions and not in the old set of installation instructions, each of the installation instructions in the first set comprising a difference flag having an add state;

a second set of installation instructions corresponding to installation instructions in the old set of installation instructions and not in the set of installation instructions, each of the installation instructions in the second set comprising a difference flag having a delete state;

a third set of installation instructions corresponding to installation instructions identically in the set of installation instructions and the old set of installation instructions, each of the installation instructions in the second set comprising a difference flag having a same state; and a fourth set of installation instructions corresponding to installation instructions in the set of installation instructions and the old set of installation instructions and not in the third set of installation instructions, each of the installation instructions in the second set comprising a difference flag having a change state.

3. The method of claim 2, wherein the producing step additionally comprises, responsive to the attempting step not locating the old set of installation instructions, providing the adjusted set of installation instructions comprising the set of installation instructions, each installation instruction comprising a difference flag indicating an add state.

4. The method of claim 1:

wherein each of the adjusted installation instruction in the set of adjusted installation instructions comprises a difference flag comprising one selected from a first state, a second state and a third state; and the building step comprises, for each of at least one of the adjusted installation instructions in the set of adjusted installation instructions:

selecting an adjusted installation instruction; and responsive to the difference flag in the first state, providing an uninstall instruction corresponding to the selected adjusted installation instruction.

5. The method of claim 1:

wherein each of the adjusted installation instruction in the set of adjusted installation instructions comprises a difference flag comprising one selected from a first state, a second state and a third state; and the building step comprises, for each of at least one of the adjusted installation instructions in the set of adjusted installation instructions:

selecting an adjusted installation instruction; and responsive to the difference flag in the second state, providing an uninstall instruction corresponding to the selected adjusted installation instruction and having an uninstall operation directing that an object corresponding to the selected adjusted installation instruction should be added during uninstall responsive to at least one of the objects identified corresponding to the selected adjusted installation instruction.

6. The method of claim 5 wherein, the building step additionally comprises providing an uninstall instruction corresponding to the selected adjusted installation instruction and having an uninstall operation directing that an object corresponding to the selected adjusted installation instruction should not be added or changed during uninstall responsive to none of the objects identified corresponding to the selected adjusted installation instruction.

7. The method of claim 1:

wherein each of the adjusted installation instruction in the set of adjusted installation instructions comprises a difference flag comprising one selected from a first state, a second state and a third state; and the building step comprises, for each of at least one of the adjusted installation instructions in the set of adjusted installation instructions:

selecting an adjusted installation instruction; and responsive to the difference flag in the third state, providing an uninstall instruction corresponding to the selected adjusted installation instruction, the uninstall instruction having an uninstall operation directing that an object corresponding to the selected adjusted installation instruction should be changed during uninstall responsive to at least one of the objects identified corresponding to the selected adjusted installation instruction.

8. The method of claim 7, wherein the building step additionally comprises responsive to the difference flag in the third state, providing an uninstall instruction corresponding to the selected adjusted installation instruction, the uninstall instruction having an uninstall operation directing that an object corresponding to the selected adjusted installation instruction should be deleted during uninstall responsive to none of the objects identified corresponding to the selected adjusted installation instruction.

9. The method of claim 1 additionally comprising the step of applying the set of installation instructions using the set of the first plurality of objects to a computer system to install at least one of the first plurality of objects.

10. The method of claim 9 additionally comprising the step of applying the set of uninstall instructions to undo the install.

11. A computer program product comprising a computer useable medium having computer readable program code embodied therein for producing a set of uninstall instructions, the computer program product comprising:

computer readable program code devices configured to cause a computer to receive a set of installation instructions and a set of a plurality of objects for installation onto a computer system;

computer readable program code devices configured to cause a computer to produce an adjusted set of installation instructions responsive to the installation instructions received;

computer readable program code devices configured to cause a computer to identify a state of each of a second plurality of objects residing on the computer system; and computer readable program code devices configured to cause a computer to build the set of uninstall instructions responsive to a plurality of the states identified and the set of adjusted installation instructions produced.

12. The computer program product of claim 11 wherein the computer readable program code devices configured to cause a computer to produce comprise:

computer readable program code devices configured to cause a computer to attempt to locate an old set of installation instructions; and computer readable program code devices configured to cause a computer to, responsive to the computer readable program code devices configured to cause a computer to attempt locating the old set of installation instructions, provide the adjusted set of installation instructions comprising:

a first set of installation instructions corresponding to installation instructions in the set of installation instructions and not in the old set of installation instructions, each of the installation instructions in the first set comprising a difference flag having an add state;

a second set of installation instructions corresponding to installation instructions in the old set of installation instructions and not in the set of installation instructions, each of the installation instructions in the second set comprising a difference flag having a delete state;

a third set of installation instructions corresponding to installation instructions identically in the set of installation instructions and the old set of installation instructions, each of the installation instructions in the second set comprising a difference flag having a same state; and a fourth set of installation instructions corresponding to installation instructions in the set of installation instructions and the old set of installation instructions and not in the third set of installation instructions, each of the installation instructions in the second set comprising a difference flag having a change state.

13. The computer program product of claim 12, wherein the producing step additionally comprises, responsive to the computer readable program code devices configured to cause a computer to attempt not locating the old set of installation instructions, provide the adjusted set of installation instructions comprising the set of installation instructions, each installation instruction comprising a difference flag indicating an add state.

14. The computer program product of claim 11:
wherein each of the adjusted installation instruction in the set of adjusted installation instructions comprises a difference flag comprising one selected from a first state, a second state and a third state; and
the computer readable program code devices configured to cause a computer to build comprise:
computer readable program code devices configured to cause a computer to select an adjusted installation instruction, for each of at least one of the adjusted installation instructions in the set of adjusted installation instructions; and
computer readable program code devices configured to cause a computer to, responsive to the difference flag in the first state, provide an uninstall instruction corresponding to the selected adjusted installation instruction, for each of at least one of the adjusted installation instructions in the set of adjusted installation instructions.

15. The computer program product of claim 11:
wherein each of the adjusted installation instruction in the set of adjusted installation instructions comprises a difference flag comprising one selected from a first state, a second state and a third state; and
the computer readable program code devices configured to cause a computer to build comprise:
computer readable program code devices configured to cause a computer to select an adjusted installation instruction, for each of at least one of the adjusted installation instructions in the set of adjusted installation instructions; and
computer readable program code devices configured to cause a computer to, responsive to the difference flag in the second state, provide an uninstall instruction corresponding to the selected adjusted installation instruction and having an uninstall operation directing that an object corresponding to the selected adjusted installation instruction should be added during uninstall responsive to at least one of the objects identified corresponding to the selected adjusted installation instruction, for each of at least one of the adjusted installation instructions in the set of adjusted installation instructions.

16. The computer program product of claim 15 wherein, the computer readable program code devices configured to cause a computer to build additionally comprise computer readable program code devices configured to cause a computer to provide an uninstall instruction corresponding to the selected adjusted installation instruction and having an uninstall operation directing that an object corresponding to the selected adjusted installation instruction should not be added or changed during uninstall responsive to none of the objects identified corresponding to the selected adjusted installation instruction.

17. The computer program product of claim 11:
wherein each of the adjusted installation instruction in the set of adjusted installation instructions comprises a difference flag comprising one selected from a first state, a second state and a third state; and
the computer readable program code devices configured to cause a computer to build comprise, computer readable program code devices configured to cause a computer to, for each of at least one of the adjusted installation instructions in the set of adjusted installation instructions:
select an adjusted installation instruction; and
responsive to the difference flag in the third state, provide an uninstall instruction corresponding to the selected adjusted installation instruction, the uninstall instruction having an uninstall operation directing that an object corresponding to the selected adjusted installation instruction should be changed during uninstall responsive to at least one of the objects identified corresponding to the selected adjusted installation instruction.

18. The computer program product of claim 17, wherein the computer readable program code devices configured to cause a computer to building additionally comprise, computer readable program code devices configured to cause a computer to, responsive to the difference flag in the third state, provide an uninstall instruction corresponding to the selected adjusted installation instruction, the uninstall instruction having an uninstall operation directing that an object corresponding to the selected adjusted installation instruction should be deleted during uninstall responsive to none of the objects identified corresponding to the selected adjusted installation instruction.

19. The computer program product of claim 11 additionally comprising computer readable program code devices configured to cause a computer to apply the set of installation instructions using the set of the first plurality of objects to a computer system to install at least one of the first plurality of objects.

20. The computer program product of claim 19 additionally comprising computer readable program code devices configured to cause a computer to apply the set of uninstall instructions to undo the install.

21. An apparatus for providing at an apparatus output a set of uninstall instructions, comprising:
a manifest differencer having a first input operatively coupled to receive a set of installation instructions, the manifest differencer for providing at an output an adjusted set of installation instructions responsive to, and different from, the set of installation instructions received at the manifest differencer input;
an object state retriever for requesting via a first output and receiving via an input information about the state of at least one computer system, and for providing at a second output a set of object state information responsive to the information received at the object state retriever input; and
an inverter having a first input coupled to the manifest differencer output for receiving the adjusted set of installation instructions, and a second input coupled to the object state retriever second output for receiving the set of object state information, the inverter for providing an intermediate set of uninstall instructions at an output coupled to the apparatus output responsive to the adjusted set of installation instructions and the set of object state information.

22. The apparatus of claim 21, wherein the uninstall instructions comprise the intermediate set of uninstall instructions.

23. The apparatus of claim 21, wherein:

the manifest differencer additionally has an alternate input operatively coupled to receive an alternate set of installation instructions describing changes made to at least one of the at least one computer system; and the manifest differencer provides the adjusted set of installation instructions additionally responsive to the alternate set of installation instructions received at the manifest differencer alternate input.

24. The apparatus of claim 23, additionally comprising an uninstall merger having a first input coupled to the inverter output for receiving the intermediate set of uninstall instructions, a second input operatively coupled for receiving an alternate set of intermediate uninstall instructions comprising instructions related to uninstalling information installed on at least one of the at least one computer system, the uninstall merger for providing at an output coupled to the apparatus output the set of uninstall instructions responsive to the intermediate set of uninstall instructions received at the uninstall merger first input and the alternate set of intermediate uninstall instructions received at the uninstall merger second input.

* * * * *